United States Patent
Fakhouri et al.

(10) Patent No.: US 10,735,278 B1
(45) Date of Patent: Aug. 4, 2020

(54) SERVICE AVAILABILITY METRICS

(71) Applicant: Pivotal Software, Inc., San Francisco, CA (US)

(72) Inventors: Onsi Joe Fakhouri, Denver, CO (US); Amit Kumar Gupta, San Francisco, CA (US); Colin Michael Humphreys, London (GB)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 16/351,195

(22) Filed: Mar. 12, 2019

(51) Int. Cl.
| | |
|---|---|
| *G06F 15/173* | (2006.01) |
| *H04L 12/24* | (2006.01) |
| *G06F 11/22* | (2006.01) |
| *G06F 9/48* | (2006.01) |
| *G06F 9/54* | (2006.01) |
| *G06F 11/14* | (2006.01) |

(52) U.S. Cl.
CPC ........ *H04L 41/5012* (2013.01); *G06F 9/4812* (2013.01); *G06F 9/541* (2013.01); *G06F 11/1458* (2013.01); *G06F 11/2268* (2013.01)

(58) Field of Classification Search
CPC ............. G06F 11/2268; G06F 11/1458; G06F 9/4812; G06F 9/541; H04L 41/5012
USPC ....................................................... 709/223
See application file for complete search history.

(56) References Cited

U.S. PATENT DOCUMENTS

| | | | | |
|---|---|---|---|---|
| 2007/0271560 | A1* | 11/2007 | Wahlert | G06F 8/61 718/1 |
| 2010/0037225 | A1* | 2/2010 | Doyle | G06F 1/3203 718/102 |
| 2017/0097845 | A1* | 4/2017 | Kouznetsov | G06F 9/45558 |

OTHER PUBLICATIONS

U.S. Appl. No. 15/256,275, filed Sep. 2, 2016, Ben Jonathan Laplanche.
U.S. Appl. No. 16/173,639, filed Oct. 29, 2018, Rajasinghe Saman Gunaratne.

\* cited by examiner

*Primary Examiner* — Tu T Nguyen
(74) *Attorney, Agent, or Firm* — Fish & Richardson P.C.

(57) ABSTRACT

Methods, systems, and apparatus, including computer programs encoded on computer storage media, for computing availability metrics for an integrated service. One of the methods includes generating, for a service installed on a software platform, a plurality of availability logs, each availability log representing an occurrence of the service becoming unavailable. The plurality of availability logs are aggregated according to one or more aggregation criteria. The aggregated availability logs are processed to compute one or more availability metrics for the service, wherein each availability metric quantifies the availability of the service to process requests from the plurality of workloads in the presence of system failures and interruptions. An availability rating for the service is computed from the one or more availability metrics.

21 Claims, 3 Drawing Sheets

SERVICE AVAILABILITY METRICS

BACKGROUND

This specification relates to cloud computing software platforms.

A cloud software platform is a platform-as-a-service ("PaaS") cloud computing system that allows users to deploy and manage multiple instances of software workloads. In this specification, a workload refers generally to one or more software tasks to be executed by a software application platform. Each task can be implemented by a package, a utility, or an executable, to name just a few examples. The tasks of a workload commonly include both components that are in active development by the entity that deploys the workload as well as off-the-shelf software components. The platform then executes the software workloads using hardware of an underlying cloud computing infrastructure, which may or may not be maintained by a different entity, e.g., an entity providing an infrastructure-as-a-service ("IaaS") platform. A cloud software platform thus functions as a software layer between the cloud computing infrastructure and the workloads executing on the infrastructure.

Some cloud software platforms provide integrated services. A service is a software subsystem that can provide one or more functionalities for use by platform workloads. An example of a service for use by a platform application is a database management system that maintains a database that can be accessed and modified by platform applications.

To provide a service, a cloud software platform can launch one or more service instances, which are software modules that implement the functionality of the service. A cloud software platform can automatically provision resources for executing service instances. This collection of resources may be referred to as a services back-end, which can either be pre-provisioned or provisioned on demand. Techniques for on-demand service provisioning are described in commonly-owned U.S. Patent Application Ser. No. 15/256,275, filed on Sep. 2, 2016, entitled, "On-Demand Resource Provisioning," which is herein incorporated by reference.

A cloud software platform can bind a service instance to a workload by providing to the workload the information necessary for the workload to use a launched service instance. This information typically includes at least a location or identifier of a service or an executing service instance, e.g., a network address, and may also include credentials required to access and use the service or service instance.

A service can be integrated into a cloud software platform by implementing a service application programming interface (API). One example of a service API is the Open Service Broker API. A service API can be used by a controller of the cloud software platform to surface available services for selection by developers or platform administrators. For example, the cloud software platform can present to developers a collection of available integrated services that can be used with their workloads. Such a collection of available integrated services that can be used by workloads can be referred to as a services marketplace. A services marketplace is thus a mechanism, an interface, or a tool of the cloud software platform that allows developers or platform administrators to self-select services to be bound to their workloads. A services marketplace does not necessarily imply a financial exchange, although some services marketplaces can require payment in order for workloads to use certain services.

In order to expose available services to developers, some cloud software platforms use service brokers. A service broker is a component or a module of a service the implements the service API. Service brokers can thus receive and interpret calls to create, update, and delete service instances, and create and delete service bindings. A service broker can be a separate module or another workload running on the platform.

One simple example of a software platform workload that can make use of integrated services is an online movie database website. One software task of the workload can implement the front-end user interface of the website, and an integrated service can execute a database system that implements backend database functionality of the website.

There are several different roles involved in implementing integrated services on a cloud software platform. In this specification, a platform operator is an entity that deploys and maintains a cloud software platform. A workload developer is an entity that submits a workload to the cloud software platform to be executed in one or more instances of computing resources of the underlying computing infrastructure. And a service developer is an entity that submits a service to the cloud software platform to be used by workloads after being selected by developers. Lastly, an end user is an entity that accesses or uses a deployed workload that makes use of an integrated service. In this context, an entity serving in of these roles can be any appropriate person or organization as the context requires, e.g., a single developer, a team of developers, developers in an enterprise, or developers who contribute software to a code base. Thus, typically, the service developers are separate from both the platform operators and workload developers.

This separation of roles means that workload developers typically have to manually gauge the respective quality of services provided by a myriad of outside service developers. Some service marketplaces provide user ratings and reviews of available services. However, such reviews are subjective, prone to manipulation, and hard to use as a basis for informed decision-making.

SUMMARY

This specification describes a cloud computing platform system that surfaces availability metrics on services that are available to be installed on a software platform.

Particular embodiments of the subject matter described in this specification can be implemented to realize one or more of the following advantages. A provider of software platforms can automatically generate objective measures of the reliability and robustness of services by computing availability metrics. These objective measures of reliability and robustness can then be provided as part of a service catalog in order for platform operators and workload developers to make informed decisions about which services to offer and which services to install. This provides an incentive for service developers to increase the reliability of services for a particular platform or all cloud software platforms. This incentive to increase reliability of services will in the long run increase the overall computing efficiency and reliability of the cloud software platform. And unlike user reviews, availability metrics that are computed by a cloud software platform itself are objective and are not prone to user manipulation or fraudulent user reviews.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

This specification describes technologies for automatically generating availability metrics for integrated services provided by service developers that are available to be installed on a cloud software platform. The availability metrics can then be used by a services marketplace to provide developers with information that would otherwise be difficult to estimate or which could only be attained by the developer manually using trial and error.

Figure 1:
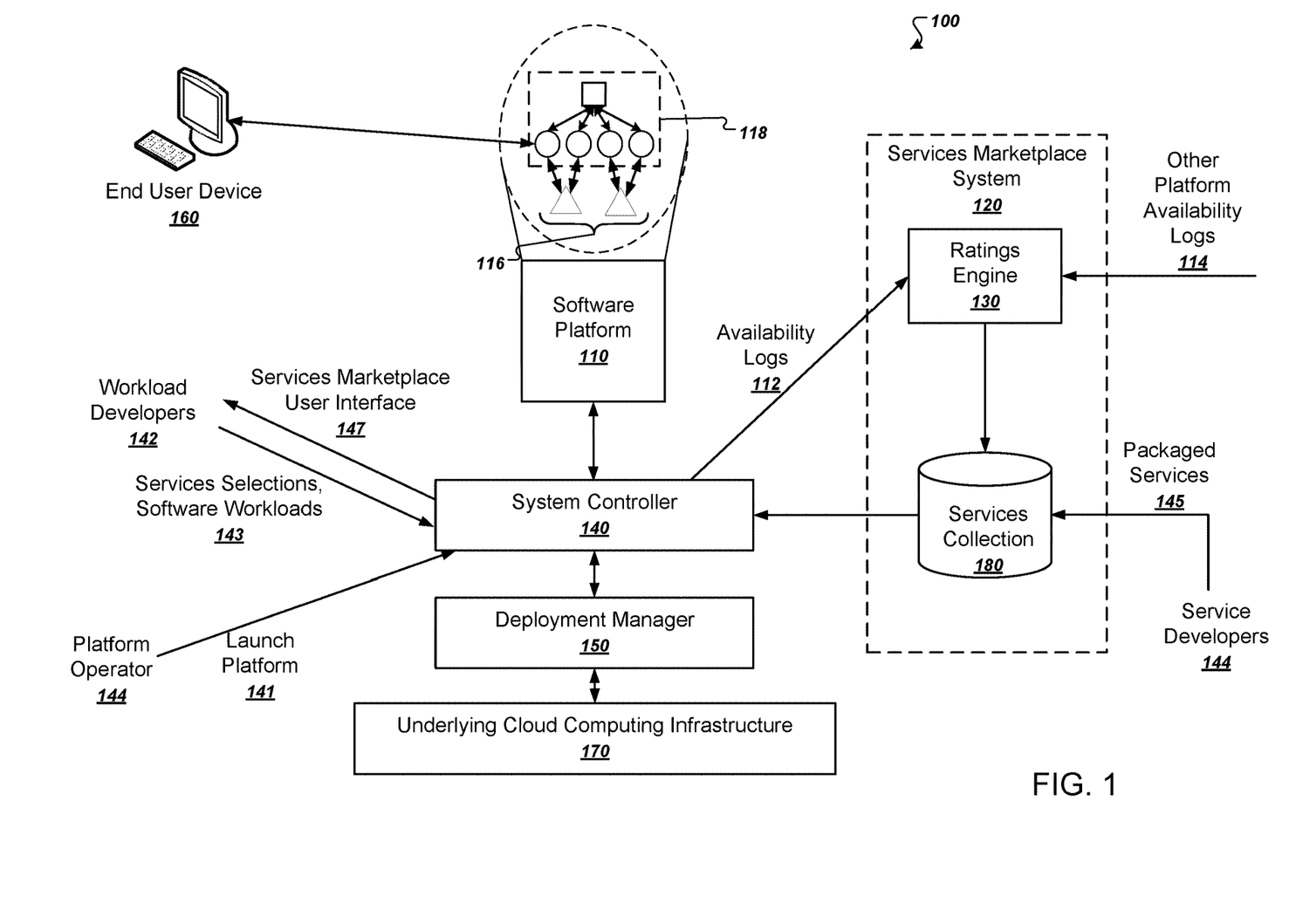
FIG. 1 illustrates an example system for launching cloud software platforms that makes use of availability metrics in a services marketplace system.

FIG. 1 illustrates an example system 100 for launching cloud software platforms that makes use of availability metrics in a services marketplace system 120.

A system controller 140 is a software system that coordinates the setup and management of a software platform system 110. For example, a platform operator 144 can request 141 that the system controller 140 launch the software platform 110. To do so, the system controller 140 can make use of a deployment manager 150 that can provision appropriate resources in an underlying cloud computing infrastructure 170. For example, the deployment manager 150 can be implemented using the open source BOSH project.

In this example, the software platform 110 is illustrated as having a cluster of nodes 118, as well as integrated service instances 116 that provide a service for use by workloads executing on the cluster of nodes 118. The cluster 118 can for example be a Kubernetes cluster, and the system controller 140 can be part of a platform orchestrator that launches Kubernetes clusters. In this specification, a platform orchestrator is a software system that provisions resources for and configures the components of a software platform, a process that for brevity can be referred to as the platform orchestrator launching the software platform. One example of a platform orchestrator is Pivotal Container Service (PKS). PKS provides developers with an interface that allows them to set up and configure Kubernetes clusters, which is an example of a cloud software platform. A Kubernetes cluster is a container orchestrator that manages the execution of software workloads in containers. A Kubernetes cluster generally includes a master node and one or more worker nodes that can execute workloads in containers and ensure that the workloads continue stateful execution even in the presence of software or hardware failures. Thus, a developer can issue a handful of command-line commands to PKS, and PKS can provide the functionality of automatically provisioning resources for and configuring the nodes of a Kubernetes cluster that executes on the underlying cloud computing platform.

The service instances 116 can implement a service developed by one or more service developers 144. A platform operator of the software platform 110 can select the service from a services marketplace system.

The a services marketplace system 120 can store packaged services 145 received from service developers 144 in a services collection 180. The services collection 180 can be populated by service operators, the service developers 144, or some combination of these. As described above, a service in execution is a software subsystem that includes one or more service instances. Thus, each of the packaged services 145 includes at least source code, executable files, or both, and any required dependencies, for launching service instances that implement the service.

A ratings engine 130 of the services marketplace system 120 can receive availability logs 112 for a service from the system controller, and optionally availability logs for the service from other platforms 114. The ratings engine 130 can then compute one or more availability metrics from the availability logs 112, which can be stored in the services collection with each of the available services. Example availability metrics include a measure of overall availability, a measure of interruption availability, and a measure of recovery time after an interruption. Computing these availability metrics is described in more detail below with reference to FIG. 2.

The system controller 140 can read the services collection 180 to obtain a list of all available services for use by workloads hosted by the software platform 110. The system controller 140 can then provide a services marketplace user interface 147 to workload developers 142. The services marketplace user interface 147 allows workload developers 142 to select services to be launched on the software platform 110.

The services marketplace user interface 147 can present, for each available service, respective values for one or more availability ratings. Each availability rating can normalize values for one or more availability metrics, e.g., into a score between 1 star and 5 stars. Computing availability ratings is described in more detail below with reference to FIG. 3.

The workload developers 142 can use the availability metrics to make a selection of one or more integrated services to be used with the workloads. Upon receiving a selection 143 of one or more services by a workload developer 142, the system controller 140 can use the deployment manager 150 to provision resources in the underlying cloud computing infrastructure 170 to host the service instances 116 to implement the selected services in the software platform 110.

Workload developers 142 can then bind services executing in the software platform 110 to their workloads. For example, an workload developer 142 can provide a packaged workload to the system controller 140. The system controller 140 can then use the deployment manager 150 to provision resources for hosting multiple instances of the workload in the software platform 110. The workload developer 142 can then issue a command to the system controller 140 to bind the service to the instances of the workload executing in the cluster 118. As shown in FIG. 1, this allows the workloads in the cluster 118 to consume the service by communicating with the service instances 116 provisioned in the software platform 110. In this example, the service instances 116 are illustrated as executing outside the cluster 118. However, in some implementations, the service instances themselves can be executing on nodes that are managed by the software platform 110. For example, one or more nodes of a container orchestrator platform can execute service instances of the selected service.

There are a number of reasons why availability metrics of integrated services can be particularly important when selecting services for some software platforms. In particular, container orchestration platforms are well-suited for hosting stateful workloads whose state should be maintained to the extent possible even in the presence of hardware failures, software failures, or other problems. Therefore, these kinds of stateful workloads are better served by services that are also robust to failures and other interruptions.

Figure 2:
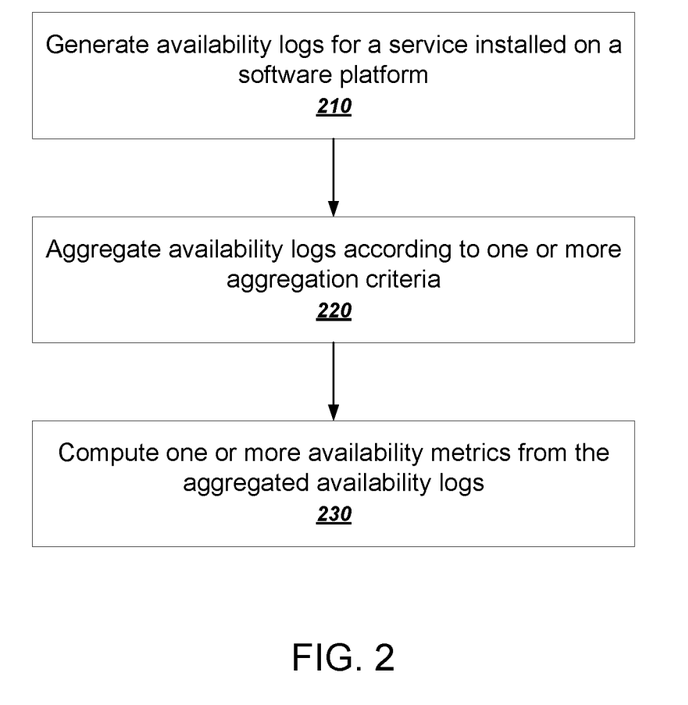
FIG. 2 is an example process for computing availability metrics for a particular service of a cloud software platform.

FIG. 2 is an example process for computing availability metrics for a particular service of a cloud software platform. The example process can be performed by any appropriate component of a software platform or a platform orchestrator. For convenience, the process will be described as being performed by a distributed system having a plurality of computers in an underlying cloud computing system and programmed appropriately in accordance with this specification. For example, the system controller 140 of FIG. 1, appropriately programmed can perform the example process.

The system generates availability logs for a service installed on a software platform (210). Each availability log is data representing an occurrence of the service installed on the software platform becoming unavailable, available, or both. For example, the system can generate availability logs that represent availability events that represent an occurrence of the service installed on the software platform becoming available. For example, if a service goes down due a software failure, the system can generate an availability log representing a date and time of the event, the type of event, an identifier of the platform, and optionally the operator of the platform. When the service becomes available again, the system can generate another availability log representing the date and time that the service came back online. If the service has multiple service instances, the system can generate availability logs that refer to availability events and unavailability events for individual service instances.

The system can also generate interruption logs that represent disruptions to the software platform itself. For example, an interruption log can represent an occurrence of the workloads on the platform being upgraded, backed up, or the platform itself being upgraded or backed up. An interruption log can also represent that networking resources have become unavailable, unstable, or slower than a threshold, for all or a portion of the software platform.

An interruption log can also represent that the platform itself suffered a full or partial outage of computing resources. For example, if half of the nodes in a cluster fail, the system can generate an interruption log that represents how many of the nodes in the cluster failed and how many nodes in the cluster remained operational. The system can also generate interruption logs that represent occurrences of a recovery after a disruption. Interruption logs can also represent wider system failures. For example, an interruption log can represent that all resources at a particular site or in a particular geographic region became unavailable.

It is common and expected for availability logs to be somewhat correlated with interruption logs. This is because system failures and upgrades are common causes of interruptions in service availability.

In some cases, platform interruptions may be rather rare events. Therefore, the system can increase the amount of interruption logs by executing forced software or hardware interruptions. In other words, the system can artificially cause a particular percentage of computing resources on the software platform to fail, e.g., 10%, 50%, 90% or 100%. As another example, the system can execute forced interruptions for computing resources at a particular site or in a particular geographic region.

In many cases, exercising the software platform in this way is also expected to cause service instances to fail and become available. In order to avoid disruptions to actual platform operators or workload developers, the system can perform forced interruptions on test software platforms that execute test workloads. For example, the system can launch a software platform and install the service on the platform along with test workloads. The system can then perform forced interruptions on the test platform and generate availability logs and interruption logs accordingly.

The system aggregates the availability logs (220). For example, a ratings engine can aggregate availability logs generated by one software platform or multiple software platforms. The ratings engine can aggregate and arrange the availability logs according to any appropriate aggregation criteria.

For example, the ratings engine can aggregate the availability logs according to a particular type or version of software platform. Similarly, the ratings engine can aggregate the availability logs according to a version of the service. As another example, the ratings engine can aggregate the availability logs by geographic region, organization that owns the platform, or by underlying IaaS provider.

The system can also optionally aggregate interruption logs according to any of the aforementioned aggregation criteria. In other words, the system can aggregate the interruption logs by platform type, platform version, service version, geographic region, organization, or IaaS provider.

The system computes one or more availability metrics from the aggregated availability logs (230). As described above, the system can compute a number of different availability metrics using the availability logs and optionally also the interruption logs.

A first availability metric is a measure of overall availability of the service. The measure of overall availability represents what fraction of time the service was available. The measure of overall availability can thus be represented as a score between two end points, or the measure of overall availability can be represented as a percentage, to name just two examples.

To compute the measure of overall availability, the system can process the availability logs and compute the length of time that existed between an occurrence of the service becoming unavailable and the next occurrence of the service becoming available again. The system can then sum up the total duration of unavailability for the service and compare it to a total length of time that the service was installed. For example, the system can sum up the total length of time for all unavailability events and divide the total by a total length of time that the service was installed.

A second availability metric is a measure of interruption availability, which quantifies availability of the service during platform interruptions. As described above, interruptions can include platform failures as well as upgrade and backup processes.

The system can compute the measure of interruption availability by processing the interruption logs to determine specific time periods over which the platform experienced an interruption. The system can then compute the measure of interruption availability as a measure of time that the service remained available during the periods of interruption. Alternatively or in addition, the system can also simply count the number of times that the service was available for at least a threshold percentage of the interruption or the number of times that the service was available when the interruption ended.

A third availability metric is a measure of recovery time. The measure of recovery time quantifies a measure of central tendency, e.g., an average, a mean, or a median, of the length of time it took a service to recover after becoming unavailable. To compute the measure of recovery time, the system can compute the durations between unavailability events and corresponding availability events as recorded in the availability logs. The system can then compute any appropriate measure of central tendency using the computed durations.

The system can also compute data-related availability metrics. Data-related availability metrics quantify the effects on data maintained by a service during unavailability events or platform interruptions. For example, the system can compute a measure of data robustness, which quantifies how much data is lost during unavailability events and platform interruptions. The system can also compute a measure of data consistency, which quantifies how much of the data remained consistent through an unavailability event or a platform interruption.

The system can also compute network-related availability metrics. Network-related availability metrics quantify the availability of a service during network-related interruptions. For example, if a particular database service automatically installs two endpoints that execute on separate nodes, the service is likely to be more resilient to network outages than another service that installs just one endpoint. Thus, the system can compute a network-related availability metric by quantifying how often a service become unavailable when the platform experienced a network-related interruption.

In addition to the availability metrics described above, the system can also compute other kinds of objective metrics that various entities may find useful when selecting service instances. For example, the system can perform compliance tests in order to compute compliance of a service with different software licensing requirements. The system can then generate a compliance metric that quantifies the level of compliance of the service.

Figure 3:
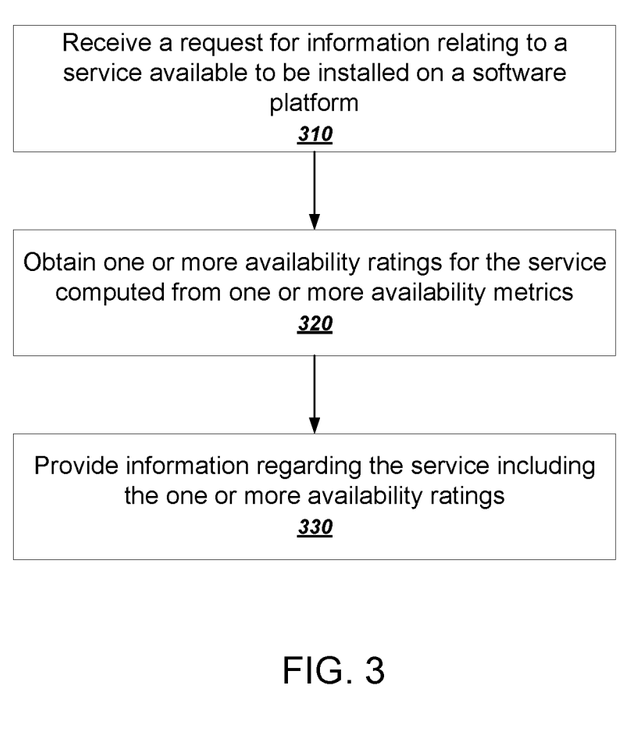
FIG. 3 is an example process for presenting services with availability metric information.

FIG. 3 is an example process for presenting services with availability metric information. For convenience, the process will be described as being performed by a distributed system having a plurality of computers in an underlying cloud computing system and programmed appropriately in accordance with this specification. For example, the services marketplace system of FIG. 1, appropriately programmed can perform the example process.

The system receives a request for information relating to a service that is available to be installed on a particular software platform (310). The request can be a request for more information about a particular service or a request to list all services that are available to be installed on the software platform.

There are a number of different entities from which the request can be received, at a number of different points in the platform and workload deployment process. For simplicity, all of these entities may be referred to as platform users, meaning users who have the ability to affect the services that are installed on the platform, which distinguishes platform users from end users of workloads that mere execute on the platform. For example, a platform operator can provide the request when deciding which services to make available for workload developers who use the platform. Alternatively or in addition, a systems manager of an organization deploying the platform can provide the request. In other words, a high-level manager of computing systems for an organization can be responsible for making decisions about which services will be available on platforms that are installed by the organization. During this process, the manager can provide the request for information related to services that are available to be installed. A platform operator of a platform may then provide a subsequent requests that further narrows down the services that are available to be installed on a particular platform.

After the platform has been deployed, the request can also be issued by workload developers using the platform. For example, the system can receive the request through a service broker API from a workload developer who requests information about integrated services that are available to be installed on the platform.

The request can also be issued by other entities who desire only off-platform uses of service instances. In other words, some software platforms can provide the ability for users to launch a service to be used by workloads that are not executing on the platform. An example of a system that provides for off-platform uses of service instances is described in commonly owned U.S. Patent Application Ser. No. 16/173,639, filed on Oct. 29, 2018, entitled "Independent Services Platform," which is herein incorporated by reference. A user with an off-platform workload can for example make a request, e.g., through a service broker API, to list all service instances that are available to be installed on the platform. The system obtains one or more availability ratings for the service (320). In this specification, an availability rating is a particular representation of one or more availability metrics. For example, the system can normalize one or more availability metrics into a scale from 1 to 5, or from 1 star to 5 stars, or from a grade of F to a grade of A, to name just a few examples. In some implementations, the system computes a single availability rating by combining multiple availability metrics. For example, the system can use a scoring function that takes as input multiple availability metrics and computes an aggregate availability score for the service.

The system provides information regarding the service including the one or more availability ratings (330). For example, the system can provide a title and a description of the service along with an availability rating for the service. The system can present this information in a command-line interface or in a graphical user interface. For example, the system can generate a graphical user interface of a services marketplace by displaying a logo for each available service along with a graphic representing the availability rating for the service.

In some implementations, the system automatically ranks the available services according to their respective availability ratings. The system can also automatically filter out or disable services that have an availability rating below a threshold.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
executing a software platform having a plurality of workloads that each make use of a service installed on the software platform and implemented by one or more service instances;
generating, for the service installed on a software platform, a plurality of availability logs, each availability log representing an occurrence of the service becoming unavailable;
aggregating a plurality of availability logs according to one or more aggregation criteria;
processing the aggregated availability logs to compute one or more availability metrics for the service, wherein each availability metric quantifies the availability of the service to process requests from the plurality of workloads in the presence of system failures and interruptions;

computing an availability rating for the service from the one or more availability metrics;

receiving, from a platform user, a request for information about the service;

in response, providing information about the service comprising the availability rating in response to the request.

Embodiment 2 is the method of embodiment 1, wherein processing the aggregated availability logs to compute one or more availability metrics for the service comprises computing a measure of overall availability of the service on the software platform.

Embodiment 3 is the method of embodiment 2, wherein processing the aggregated availability logs to compute one or more availability metrics for the service comprises processing the availability logs to compute a total duration of unavailability for the service; and computing a ratio of the total duration of unavailability to a total length of time that the service was installed on the software platform.

Embodiment 4 is the method of any one of embodiments 1-3, wherein processing the aggregated availability logs to compute one or more availability metrics for the service comprises computing a measure of interruption availability for the service, wherein the measure of interruption availability quantifies availability of the service during platform interruptions.

Embodiment 5 is the method of embodiment 4, wherein the platform interruptions comprise upgrade processes, platform failures, or backup processes.

Embodiment 6 is the method of any one of embodiments 1-5, wherein processing the aggregated availability logs to compute one or more availability metrics for the service comprises computing a measure of recovery time that represents a measure of how long the service takes to recover after a failure on the platform.

Embodiment 7 is the method of any one of embodiments 1-6, wherein aggregating the plurality of availability logs according to one or more aggregation criteria comprises aggregating availability logs generated by multiple different software platforms.

Embodiment 8 is the method of embodiment 7, further comprising:

launching a test software platform and installing the service on the test software platform; and executing a forced software or hardware interruption on the test software platform to generate one or more availability logs on the test software platform, wherein aggregating the plurality of availability logs comprises aggregating the availability logs generated by the test software platform.

Embodiment 9 is the method of any one of embodiments 1-8, wherein processing the aggregated availability logs to compute one or more availability metrics for the service comprises computing a data-related availability metric that quantifies one or more effects on data due to an unavailability event or a platform interruption.

Embodiment 10 is the method of any one of embodiments 1-9, wherein processing the aggregated availability logs to compute one or more availability metrics for the service comprises computing a network-related availability metric that quantifies availability of a service during network interruptions of the platform.

A system comprising: one or more computers and one or more storage devices storing instructions that are operable, when executed by the one or more computers, to cause the one or more computers to perform the method of any one of claims 1 to 10.

A computer storage medium encoded with a computer program, the program comprising instructions that are operable, when executed by data processing apparatus, to cause the data processing apparatus to perform the method of any one of claims 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a plurality of computers and one or more storage devices storing instructions that are operable, when executed by the plurality of computers, to cause the plurality of computers perform operations comprising:

executing a software platform having a plurality of workloads that each make use of a service installed on the software platform and implemented by one or more service instances;

generating, for the service installed on a software platform, a plurality of availability logs, each availability log representing an occurrence of the service becoming unavailable;

aggregating a plurality of availability logs according to one or more aggregation criteria;

processing the aggregated availability logs to compute one or more availability metrics for the service, wherein each availability metric quantifies the availability of the service to process requests from the plurality of workloads in the presence of system failures and interruptions;

computing an availability rating for the service from the one or more availability metrics;

receiving, from a platform user, a request for information about the service;

in response, providing information about the service comprising the availability rating in response to the request.

2. The system of claim 1, wherein processing the aggregated availability logs to compute one or more availability metrics for the service comprises computing a measure of overall availability of the service on the software platform.

3. The system of claim 2, wherein processing the aggregated availability logs to compute one or more availability metrics for the service comprises processing the availability logs to compute a total duration of unavailability for the service; and computing a ratio of the total duration of unavailability to a total length of time that the service was installed on the software platform.

4. The system of claim 1, wherein processing the aggregated availability logs to compute one or more availability metrics for the service comprises computing a measure of interruption availability for the service, wherein the measure of interruption availability quantifies availability of the service during platform interruptions.

5. The system of claim 4, wherein the platform interruptions comprise upgrade processes, platform failures, or backup processes.

6. The system of claim 1, wherein processing the aggregated availability logs to compute one or more availability metrics for the service comprises computing a measure of recovery time that represents a measure of how long the service takes to recover after a failure on the platform.

7. The system of claim 1, wherein aggregating the plurality of availability logs according to one or more aggregation criteria comprises aggregating availability logs generated by multiple different software platforms.

8. The system of claim 7, wherein the operations further comprise:

launching a test software platform and installing the service on the test software platform; and executing a forced software or hardware interruption on the test software platform to generate one or more availability logs on the test software platform, wherein aggregating the plurality of availability logs comprises aggregating the availability logs generated by the test software platform.

9. The system of claim 1, wherein processing the aggregated availability logs to compute one or more availability metrics for the service comprises computing a data-related availability metric that quantifies one or more effects on data due to an unavailability event or a platform interruption.

10. The system of claim 1, wherein processing the aggregated availability logs to compute one or more availability metrics for the service comprises computing a network-related availability metric that quantifies availability of a service during network interruptions of the platform.

11. A computer-implemented method comprising:

executing a software platform having a plurality of workloads that each make use of a service installed on the software platform and implemented by one or more service instances;

generating, for the service installed on a software platform, a plurality of availability logs, each availability log representing an occurrence of the service becoming unavailable;

aggregating a plurality of availability logs according to one or more aggregation criteria;

processing the aggregated availability logs to compute one or more availability metrics for the service, wherein each availability metric quantifies the availability of the service to process requests from the plurality of workloads in the presence of system failures and interruptions;

computing an availability rating for the service from the one or more availability metrics;

receiving, from a platform user, a request for information about the service;

in response, providing information about the service comprising the availability rating in response to the request.

12. The method of claim 11, wherein processing the aggregated availability logs to compute one or more availability metrics for the service comprises computing a measure of overall availability of the service on the software platform.

13. The method of claim 12, wherein processing the aggregated availability logs to compute one or more availability metrics for the service comprises processing the availability logs to compute a total duration of unavailability for the service; and computing a ratio of the total duration of unavailability to a total length of time that the service was installed on the software platform.

14. The method of claim 11, wherein processing the aggregated availability logs to compute one or more availability metrics for the service comprises computing a measure of interruption availability for the service, wherein the measure of interruption availability quantifies availability of the service during platform interruptions.

15. The method of claim 14, wherein the platform interruptions comprise upgrade processes, platform failures, or backup processes.

16. The method of claim 11, wherein processing the aggregated availability logs to compute one or more availability metrics for the service comprises computing a measure of recovery time that represents a measure of how long the service takes to recover after a failure on the platform.

17. The method of claim 11, wherein aggregating the plurality of availability logs according to one or more aggregation criteria comprises aggregating availability logs generated by multiple different software platforms.

18. The method of claim 17, further comprising:

launching a test software platform and installing the service on the test software platform; and executing a forced software or hardware interruption on the test software platform to generate one or more availability logs on the test software platform, wherein aggregating the plurality of availability logs comprises aggregating the availability logs generated by the test software platform.

19. The method of claim 11, wherein processing the aggregated availability logs to compute one or more availability metrics for the service comprises computing a data-related availability metric that quantifies one or more effects on data due to an unavailability event or a platform interruption.

20. The method of claim 11, wherein processing the aggregated availability logs to compute one or more availability metrics for the service comprises computing a network-related availability metric that quantifies availability of a service during network interruptions of the platform.

21. One or more non-transitory computer storage media encoded with computer program instructions that when executed by one or more computers cause the one or more computers to perform operations comprising:

executing a software platform having a plurality of workloads that each make use of a service installed on the software platform and implemented by one or more service instances;

generating, for the service installed on a software platform, a plurality of availability logs, each availability log representing an occurrence of the service becoming unavailable;

aggregating a plurality of availability logs according to one or more aggregation criteria;

processing the aggregated availability logs to compute one or more availability metrics for the service, wherein each availability metric quantifies the availability of the service to process requests from the plurality of workloads in the presence of system failures and interruptions;

computing an availability rating for the service from the one or more availability metrics;

receiving, from a platform user, a request for information about the service;

in response, providing information about the service comprising the availability rating in response to the request.

\* \* \* \* \*